United States Patent [19]

Spitznagel et al.

[11] Patent Number: 6,081,815
[45] Date of Patent: Jun. 27, 2000

[54] METHOD FOR PROCESSING A HYPERLINK FORMATTED MESSAGE TO MAKE IT COMPATIBLE WITH AN ALPHANUMERIC MESSAGING DEVICE

[75] Inventors: Kim Loring Spitznagel, Lantana; Gerald Herbert Johnson, Jr., Boynton Beach, both of Fla.

[73] Assignee: Motorola, Inc., Schaumburg, Ill.

[21] Appl. No.: 08/944,278

[22] Filed: Oct. 6, 1997

[51] Int. Cl.[7] .................................................. G06F 3/14
[52] U.S. Cl. ........................................... 707/501; 707/513
[58] Field of Search ................................... 707/501, 513; 455/31.3, 32.1, 412; 345/124

[56] References Cited

U.S. PATENT DOCUMENTS

| | | | |
|---|---|---|---|
| 5,355,472 | 10/1994 | Lewis | 707/101 |
| 5,629,846 | 5/1997 | Crapo | 708/705 |
| 5,745,908 | 4/1998 | Anderson et al. | 707/513 |
| 5,781,914 | 7/1998 | Stork et al. | 707/501 |
| 5,802,299 | 9/1998 | Logan et al. | 709/218 |
| 5,809,415 | 9/1998 | Rossmann | 455/422 |
| 5,944,791 | 8/1999 | Scherpbier | 709/218 |
| 5,948,066 | 9/1999 | Whalen et al. | 709/229 |
| 5,968,125 | 10/1999 | Garrick et al. | 709/224 |
| 5,999,940 | 12/1999 | Ranger | 707/103 |
| 6,009,459 | 10/1999 | Belfiore et al. | 709/203 |
| 6,012,102 | 1/2000 | Shachar | 710/5 |

OTHER PUBLICATIONS

Pagers, PDAs find new links to the Internet, Moore et al., PC Week, p. 1, Sep. 9, 1996.

Wireless E–mail, fax, and paging, Abernathy, PC World, p. 1, Mar. 1, 1995.

AirNote offers all–in–one solution for paging needs, Kramer, PC Week, p. 1, Oct. 3, 1994.

Pagers bulk up, branch out with keyboards . . . , PC Week, p. 1, Jul. 21, 1997.

Wireless, AT&T Wireless services introduces Internet messaging services . . . , Edge . . . , vol. 12, p. 17, Jun. 16, 1997.

Help! my cell phone has a browser!, Machrone, PC Magazine, v16, n10, p. 85, May 27, 1997.

Alphanumeric paging poised for big growth . . . , Streeter, MacWeek, v11, n5, pp. 29–32, Feb. 3, 1997.

Mowgli WWW software . . . , Liljeberg et al, IEEE, pp. 33–37, May 1996.

Primary Examiner—Stephen S. Hong
Assistant Examiner—Cesar B. Paula
Attorney, Agent, or Firm—James A. Lamb

[57] ABSTRACT

A method processes a hyperlink formatted message to make it compatible with an alphanumeric messaging device (118) that lacks hyperlink decoding capability. The hyperlink formatted message includes at least one hyperlink having tags, a hyperlink identifier, and a resource locator. The method, which is used in a messaging controller of a messaging system (100) that communicates with a plurality of alphanumeric messaging devices, replaces (210) all occurrences of a first character within the hyperlink formatted message with a second displayable character, marks (220) each hyperlink identifier within the hyperlink formatted message using the first displayable character, removes (225) the tags and resource locator of each of the at least one hyperlink, and stores (227) the resource locator of each of the at least one hyperlink in association with the hyperlink identifier.

12 Claims, 3 Drawing Sheets

6,081,815

METHOD FOR PROCESSING A HYPERLINK FORMATTED MESSAGE TO MAKE IT COMPATIBLE WITH AN ALPHANUMERIC MESSAGING DEVICE

RELATED APPLICATIONS

Application Ser. No. 08/769,813, abandoned filed Dec. 19, 1996 by Davani, entitled "Remote Token Based Information Acquisition System".

FIELD OF THE INVENTION

This invention relates in general to two way personal messaging systems and more particularly to a two way personal messaging system that allows a user having a conventional alphanumeric messaging device to interpret Internet or intranet messages.

BACKGROUND OF THE INVENTION

The world wide web (www) is quickly emerging as a standard for information publishing, and it is a rich source of timely information. One of the key features of this form of information is the inclusion of hyperlinks in information messages received from a website using the "HTML" (hyper text markup language), that are commonly presented on a sophisticated display screen in a www browser window (such as Netscape Navigator™, distributed by Netscape Communications Corp., Mountain View, Calif., and Internet Explorer, distributed by Microsoft Corp., Redmond, Wash.), as underlined text. These hyperlinks indicate that information related to the under-lined topic can be retrieved by selecting the underlined word or words in the browser. This hyperlink is actually a link to another website, and is indicated in the protocol of the HTML, hyper text transport protocol (http), by "tags", and includes text that indicates the hyperlink. For example, the following information is a portion of a message which includes a hyperlink, as viewed in a typical browser:

... claimed that he was 'innocent' of any wrongdoing in the Whitewater affair . . . .

The information in this example was sent to the browser in HTML protocol as:

... claimed that he was 'innocent' of any wrongdoing in the <A HREF="http://www.whitewater.com"> Whitewater </A>affair . . . .

In this example, a leading and trailing anchor (A) tag (each of which comprises the <>symbols and the characters between them) delineate the text "Whitewater" that identifies the anchor (hyperlink). The hyperlink address, or more properly the uniform resource locator (url) of the hyperlink, is the "http://www.whitewater.com" located within the leading anchor tag. It is this text, that indicates the existence of a hyperlink to a user, that is underlined by the browser program when presented by the www browser window. Browsers often present the underlined text in a color different than other text, as well as underlining it. It will be appreciated that underlining and changing the color of the text are techniques that involve changing displayable attributes of the characters. The entire sequence of characters in the hyperlink, including the two anchor tags and the text between them, is called an HTML element.

Because a customer demand exists for access to the information available on the world wide web as well as other information networks, the use of hyperlinks by communication devices in most communication systems is an aspect that is highly desirable. However, a problem exists in phasing in the use of hyperlinks in existing communication systems that have communication devices that lack an ability to decode a hyperlink, such as pagers already in use in many paging systems. In this sense, decoding a hyperlink means a) locating the hyperlink in the message, b) removing the tags, uniform resource locator, and anything else other than the text that identifies the hypertext link (so as to not confuse a user), and c) marking the text that identifies the hyperlink. Newer communication devices may be equipped to decode hyperlinks, but what is needed is a technique that provides identification of a hyperlink in a communication system that includes communication devices that do not have a function for decoding a hyperlink.

DESCRIPTION OF A PREFERRED EMBODIMENT

Figure 1:
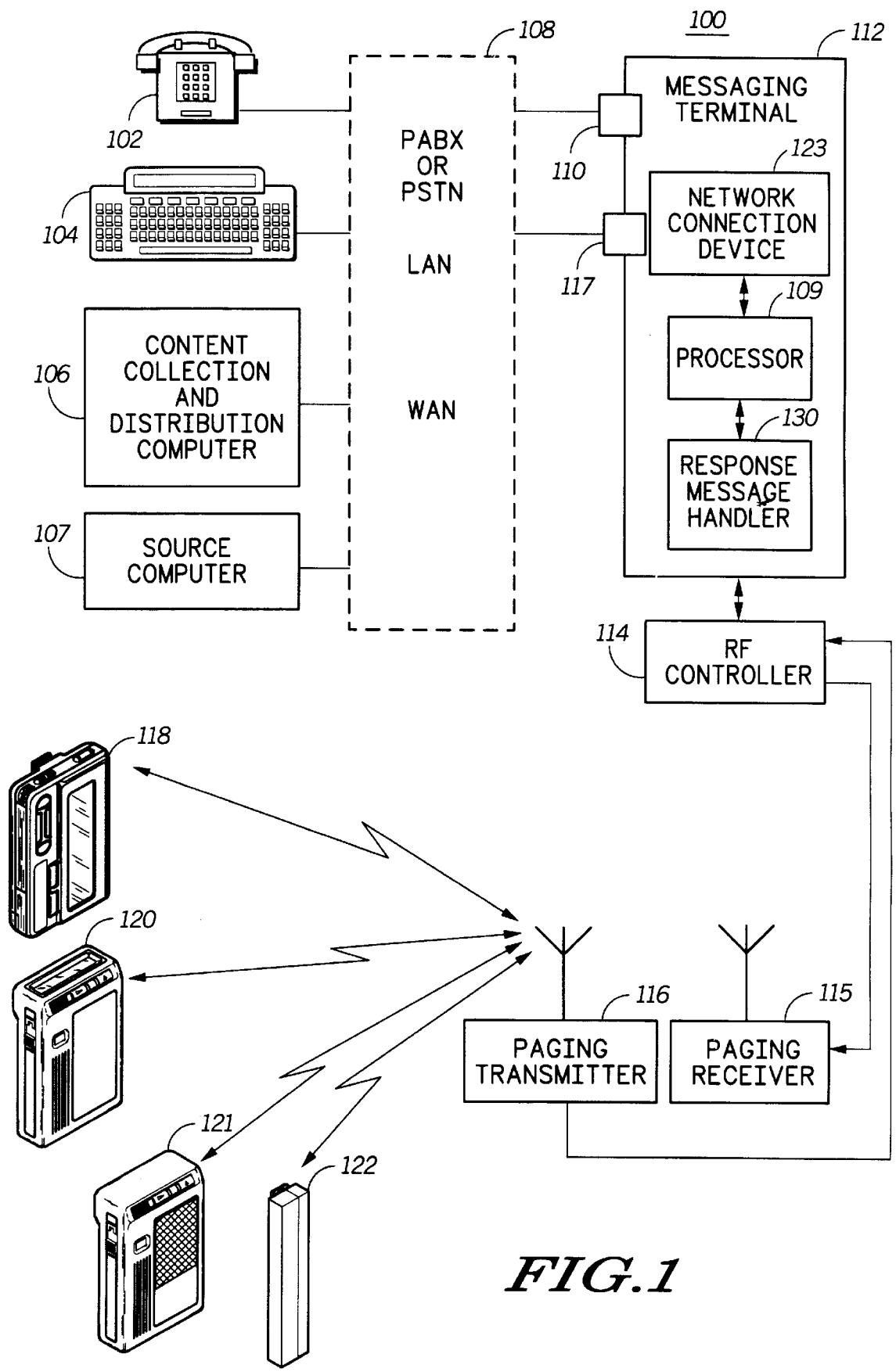
FIG. 1 shows a block diagram of a messaging system, in accordance with the preferred embodiment of the present invention.

Referring to FIG. 1, a messaging system 100, accepts page or messaging requests from several external sources, e.g. a telephone 102, a page entry device 104, a content collection and distribution computer (CCDC) 106, and a source computer 107. The source computer 107 shown here is exemplary in nature, and can function as a messaging client, a world wide web client, an information system host, or as a world wide web host for both retrieving and serving information to other clients.

A page or messaging request is normally accepted through a telephone network input for a public or private telephone network 108 that preferably includes capabilities for connecting to a local area network (LAN) or wide area network (WAN) for effecting high speed network connections to devices such as the CCDC 106 and the source computer 107. The public or private telephone network 108 couples the page request from one of the sources (i.e., voice message or computer message generators) to an automatic telephone input 110 or a network input 117 at a messaging terminal 112. The public or private telephone network 108, as well as dedicated inputs, are connected by one or more network connection devices 123 such as modems or high speed network interfaces, e.g., IEEE 802.3 or the like, supporting TCP/IP or the like connections to both the Internet and intranets.

The messaging terminal 112 comprises the network connection device 123, the automatic telephone input 110, the network input 117, a processor 109, and a response message handler 130. The messaging terminal 112 is preferably a conventional WMG™ Administrator! model messaging terminal made by Motorola, Inc., of Schaumburg, Ill.

After accepting the page request, the messaging terminal 112 routes a selective call message comprising a selective call address, and possibly a canned message, to a radio frequency (RF) controller 114 for transmission to a selective call receiver (more generically referred to as a personal messaging device). The message is configured for a protocol, such as the well known FLEX™ protocol licensed by Motorola, Inc., by the RF controller 114, which is preferably a Conductor!™ model RF controller made by Motorola and coupled to a transmitter 116, which is preferably a Symphony™ model transmitter made by Motorola, Inc. Conventional messaging systems may convey information from a caller to pager user via a plurality of message formats. Each message format can denote a mode of data (e.g., characters, numbers, audio, graphics, or "just a beep") being sent to the pager. FIG. 1 illustrates a number of personal messaging devices, alternatively called selective call receivers, subscriber units, and personal messaging units, that can receive information messages from the messaging terminal 112. The personal messaging devices illustrated are an alphanumeric messaging device 118 that is a selective call receiver that is of conventional design and has two way messaging capability, a numeric display pager 120, a voice message pager, 121 and a tone only pager 122. In the later case, the tone only pager 122 (i.e., no message is presented to the user), alerts (e.g., an audible beep), the user that a caller wants the pager user to respond by calling a prearranged telephone number, such as a receptionist telephone number. Additionally, the RF controller 114 is coupled with a conventional messaging receiver 115 that operates to receive inbound signaling information (e.g., acknowledge back responses and return channel messages) from the alphanumeric messaging device 118 and route it to the messaging terminal 112. The alphanumeric messaging device is preferably a Pagewriter™ two way pager made by Motorola, Inc. of Schaumburg, Ill., which has an alphanumeric display. The messaging receiver 115 is preferably an Audience™ model receiver made by Motorola, Inc. The messaging terminal 112, the RF controller 114, the transmitter 116, and the messaging receiver 115 can alternatively be of different model and manufacture.

Acknowledge back responses convey information such as whether a particular message was correctly received (i.e., without errors). Return channel messages can be either return channel "canned" messages or return channel alphanumeric messages. Return channel "canned" messages are generated by the user, either by selecting a button that generates an indicated predetermined return channel "canned" message, or by selecting from a list of responses that has been included in a message received by the alphanumeric messaging device 118. An example of the "canned" response is one that indicates to the messaging terminal 112 a request for access to a predetermined home page. In some models of alphanumeric messaging devices 118, an ad hoc alphanumeric return channel message can be generated by using an alphanumeric keyboard that is a part of the alphanumeric messaging device 118. In response to a content of the return channel signaling information including a canned request for access to a predetermined home page, the messaging terminal 112, using the processor 109 in conjunction with the network connection device 123, accesses the CCDC 106 to retrieve information content in the form of a hypertext message language (HTML) from a source computer 107 corresponding with a uniform resource locator (url) for the home page stored in a database of the messaging terminal 112. The CCDC 106 then receives a home page message in HTML from the source computer 107 comprising information intended for the alphanumeric messaging device 118. The information content of the home page message is then uniquely reformatted by the CCDC 106 as described herein, below, and sent to the messaging terminal 112 which modifies the message in accordance with parameters of the alphanumeric messaging device for which the message is intended, such as replacing a number that identifies an alphanumeric messaging device within the PSTN 108 with an "electronic" identifying number of the alphanumeric messaging device necessary for use within the RF protocol. The messaging terminal 112 then routes the message to the transmitter 116 via the RF controller 114 for broadcasting as a return selective call message to the requesting alphanumeric messaging device 118 using a conventional RF protocol. The CCDC 106 comprises a conventional set of computer hardware that runs under control of a Windows NT™ operating system distributed by Microsoft, Inc., and includes unique program instructions in the form of software (such as a file on a hard disk) or hardware (such as read only memory) that controls the CCDC 106 to perform the unique functions described herein. It will be appreciated that the CCDC 106 could be an alternative computer model as well, having appropriate unique program instructions.

The CCDC 106 and messaging terminal 112 together can be collectively referred to as a messaging controller which, in an alternative embodiment of the present invention, can comprise a single processing device, particularly in a messaging system 100 that interfaces to a moderate number of personal messaging devices (e.g., 1000) and in which the number of differing source computers 107 to which the messaging system 100 interfaces is small. For example, when the messaging system 100 interfaces only to a weather reporting system, or when the messaging system 100 interfaces only to the world wide web, reformatting functions of the CCDC and the messaging terminal 112 can co-exist with the messaging controller.

While the information, or message, having hyperlink content has been described above as being HTML information, it will be appreciated that other sources providing messages that include hyperlinks are possible that do not use the well known http format. The use of underlining and/or changing another attribute of the characters (such as the color) is a natural, uniform choice for identifying hyperlinks in messages received from such other sources, but there is a problem in the ability to use such hyperlink messages in the significant base of existing alphanumeric messaging devices that do not have a function for decoding the hyperlink and that in some cases also lack the ability to displaying underlined text or otherwise modify displayable attributes of the text in a unique manner for hyperlinks. As an example of a non HTML information source, a commercial nationwide or worldwide weather reporting service could exist that has a large database of information that is conveniently transferred to a user as messages that include hyperlinks indicated in a manner other as than specified in http. In the case of both http and other information formats having hyperlinks, there exists tags or equivalents thereof (those symbols which identify the extent of the hyperlink to a computer), an associated identifier of the hyperlink (i.e., a word or phrase description), and an associated source address, which, in HTML is the url included within the leading tag. For convenience the http tags and equivalents are called herein simply tags. The source address in the http format is called a uniform resource locator (url). For simplicity, the source address in other (non HTML) messages and the url are hereinafter called a resource locator (RL), and the combination of the tags, the RL, and the identifier of the hyperlink is called a hyperlink for both HTML messages and other types of messages.

Figure 2:
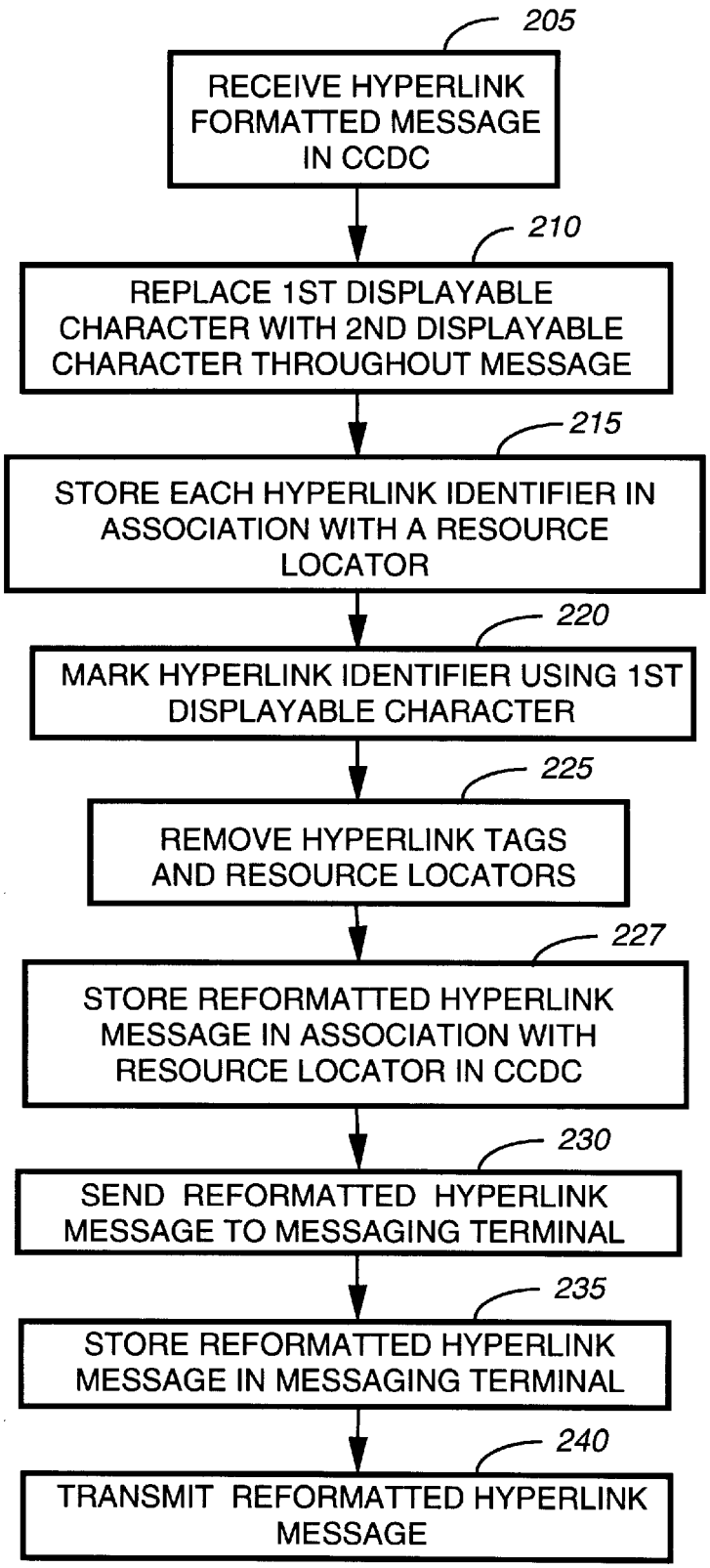
FIG. 2 shows a flow chart of a method used in the messaging system to process a message having hyperlink content to make it compatible with a conventional alphanumeric messaging device, in accordance with the preferred embodiment of the present invention.

Referring to FIG. 2, a flow chart of a method used in the messaging system 100 to process a message having hyperlink content to make it compatible with a conventional alphanumeric messaging device is shown, in accordance with the preferred embodiment of the present invention. The method is used in messaging systems in which compatibility with conventional alphanumeric messaging devices is desired. Conventional alphanumeric messaging devices as used herein describes alphanumeric messaging devices 118 that are two way messaging devices of conventional design that do not have a hyperlink decoding function to remove tags, remove resource locators, and mark the identifier of the hyperlink, and includes such alphanumeric messaging devices that furthermore cannot provide character underlining or other unique displayable character attributes. At step 205, a message that includes hyperlink information (i.e., a hyperlink formatted message) is received by the CCDC 106, for example in response to a prior transmission by a conventional alphanumeric messaging device of a home page request. At step 210 the CCDC 106 replaces all occurrences of a first displayable character within the hyperlink formatted message with a second displayable character. The first displayable character is preferably the back tic (identifiable as the character having decimal value 96 in the American Standard for Coded Information Interchange (ASCII)). The second displayable character is preferably the single quote (the character having decimal value 39 in ASCII). Alternatively, other character symbols can be chosen, but both the first and second displayable characters preferably have the characteristic of being displayable by all conventional alphanumeric messaging devices with which the messaging system 100 is to be compatible, and the first displayable character is preferably found infrequently in messages sent by the messaging system 100 to the alphanumeric messaging devices. It will be appreciated that the term "displayable character" as used herein excludes the underlining of characters, because underlining is an attribute of displayable characters, not a displayable character itself. The CCDC 106 at step 215 identifies each hyperlink in the hyperlink formatted message by the tags and stores the hyperlink identifier and the resource locator of each hyperlink in a CCDC message memory, in association with each other, for example in a database. At step 220, the CCDC 106 marks each hyperlink identifier within the hyperlink formatted message, using the first displayable character. At step 225, the CCDC 106 removes the tags and resource locators. The resulting message is a reformatted hyperlink message. The reformatted message is stored in the CCDC message memory at step 227, in association with the hyperlink identifiers and the resource locators found therein. At step 230 the CCDC 106 routes the reformatted hyperlink message to the messaging terminal 112. The response message handler 130 reconfigures the reformatted hyperlink message in accordance with parameters unique to the alphanumeric messaging device for which the message is intended. The reformatted hyperlink message is sent to the RF controller 114, which stores the reformatted message in a RF controller message memory at step 235, further configures it within an RF protocol and sends it to the transmitter 116, which at step 240 transmits the reformatted hyperlink message. It will be appreciated that the steps are described in a preferable order of performance, but that other orders can be used, some of them requiring more complex program instruction sequences.

This operation is illustrated by an example of reformatting of a hyperlink formatted message which is an HTML message, in accordance with the preferred embodiment of the present invention. The hyperlink formatted message in the example is:

. . . claimed that he was 'innocent' of any wrongdoing in the <A HREF="http://www.whitewater.com"> Whitewater </A>affair . . . .

The leading and trailing anchor (A) tags (each identified by the <>symbols) precede and follow the text "Whitewater" that identifies the anchor (the hyperlink). The uniform resource locator (url) of the hyperlink is the "http://www.whitewater.com" located in the leading anchor tag. The text "Whitewater" indicates to the user the existence of a hyperlink, and exemplifies text that is typically found in any http anchor or hyperlink message in another protocol, that identifies the hyperlink to the user. This text is named herein "the hyperlink identifier". The sequence that includes the two anchor tags and the text between them is called an HTML element, but also referred to herein just as the hyperlink.

In this example, the word "innocent" is preceded and followed by the first conventionally displayable character, which is the back tic symbol ('). In most text, the back tic is used infrequently. The CCDC 106 finds and replaces the back tics with a second conventionally displayable character, the single quotation mark ('). The CCDC 106 then uses the back tic to mark the hyperlink identifier (Whitewater) by preceding and following the hyperlink identifier with a back tic symbol. Then the CCDC 106 removes the hyperlink tags and stores the url "http://www.whitewater.com" in association with "Whitewater". The reformatted hyperlink message is communicated to the transmitter 116, which broadcasts it to the alphanumeric messaging device. The resulting, reformatted hyperlink message is as follows:

. . . claimed that he was 'innocent' of any wrongdoing in the 'Whitewater' affair . . . .

It will be appreciated that other characters can be used for the first and second conventionally displayable characters. For example, the first conventionally displayable character can be the left bracket ([). It can be replaced by the second conventionally displayable character which is a left parenthesis. In this example, a third conventionally displayable character, the right bracket (]) would preferably also be replaced by a fourth conventionally displayable character, the right parenthesis. Then the right and left brackets can be used to mark the hyperlink identifier (i.e., it is marked by both the first and third conventionally displayable character). An advantage of using the back tic is that it's usage is generally uncommon, so that the original meaning of the hyperlink message is less likely to be altered by the character changing. As an example of this approach, the hyperlink formatted message is:

. . . claimed that he was [innocent] of any wrongdoing in the <A HREF="http://www.whitewater.com"> Whitewater </A>affair . . . .

The reformatted hyperlink message is:

. . . claimed that he was (innocent) of any wrongdoing in the [Whitewater] affair . . . .

The user of the alphanumeric messaging device that has received the reformatted hyperlink message is then alerted of the existence of a hyperlink.

Figure 3:
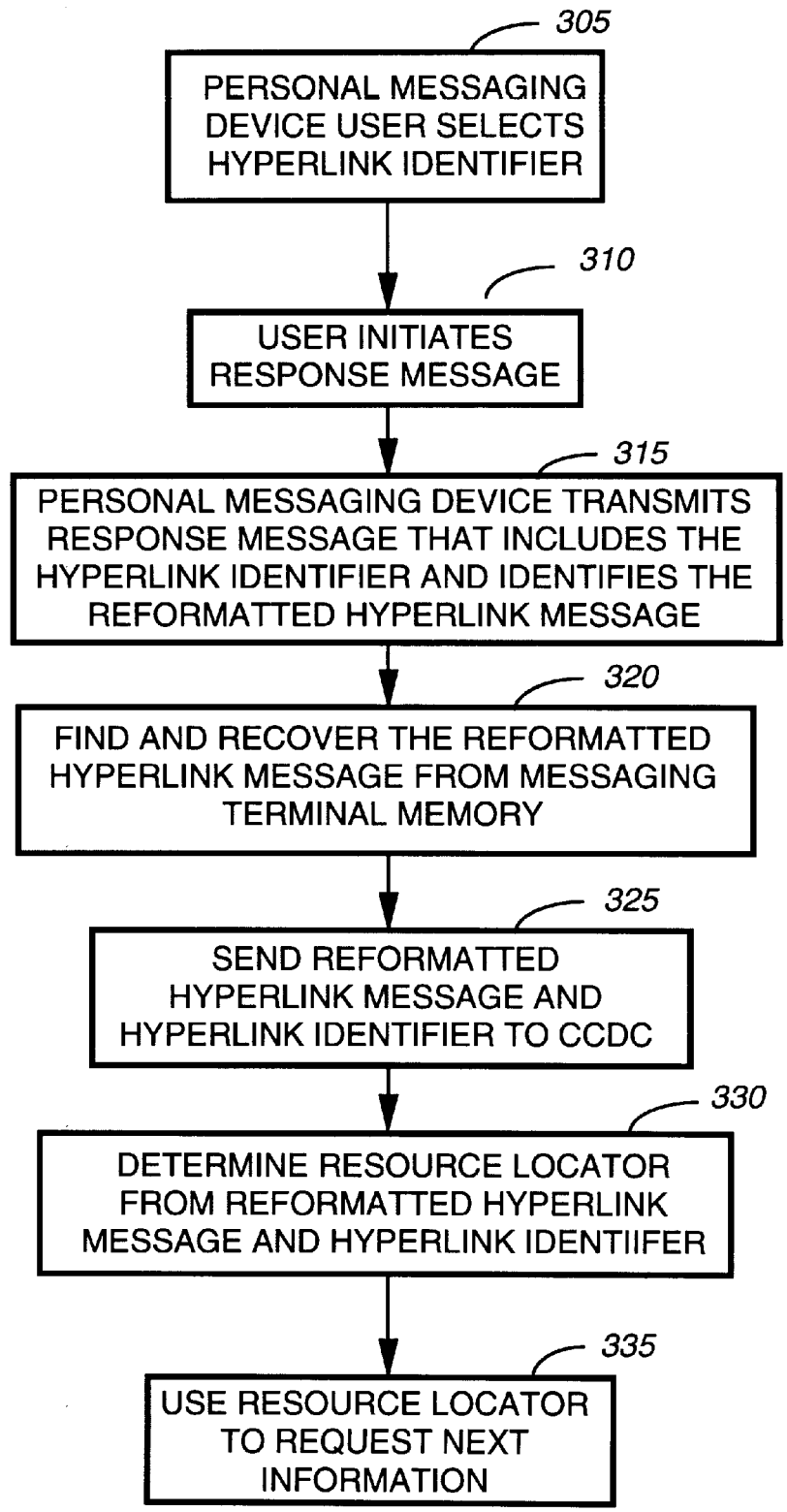
FIG. 3 shows a flow chart of a method used in the messaging system to process a response to a reformatted hyperlink message, in accordance with a preferred embodiment of the present invention.

Referring to FIG. 3, a flow chart of a method used in a messaging system 100 to process a response to a reformatted hyperlink message is shown, in accordance with a preferred embodiment of the present invention. At step 305, a user of a alphanumeric messaging device that has received a reformatted hyperlink message selects a hyperlink identifier that is displayed with a portion of the reformatted hyperlink message. Such selection is made, for example, by moving a cursor under a character within the hyperlink identifier. The hyperlink identifier is, of course, made obvious by the back tic (the first displayable character in accordance with the preferred embodiment of the present invention) which precedes and follows it. When the hyperlink identifier has been selected, the user initiates a response to the reformatted hyperlink message at step 310, for example, by depressing a hyperlink request key. At step 315, the alphanumeric messaging device transmits a response message that includes the hyperlink identifier and that also includes a message identifier that identifies the reformatted hyperlink message from which the hyperlink has been selected. The identification of the reformatted hyperlink message is preferably accomplished by reporting back the protocol position (e.g., hour 15, cycle 3, frame 45, block 10, word 5 in the FLEX™ protocol) at which the beginning of the reformatted hyperlink message was transmitted. The response is received by the messaging receiver 115 and sent to the RF controller 114. At step 320, the RF controller 114 uses the message identifier to recover the reformatted hyperlink message that was stored at step 235 with reference to FIG. 2. The reformatted hyperlink message is then sent at step 325 to the messaging terminal 112, which in turn sends it to the CCDC 106 along with the hyperlink identifier selected by the user of the alphanumeric messaging device, and an identity of the alphanumeric messaging device. At step 330, the CCDC 106 determines the resource locator from the hyperlink identifier and the reformatted hyperlink message received from the messaging terminal 112 and formats a request message that is sent to the resource location at step 335, which typically results in another formatted hyperlink message that can be returned to the alphanumeric messaging device using the identity of the alphanumeric messaging device received with the reformatted hyperlink message.

It will be appreciated that there are alternative methods for tracking the reformatted hyperlink message, other than storing the complete message as described at steps 225 and 235. For example, the reformatted hyperlink message can be identified by a message code which is generated by the CCDC 106. The message code, instead of the message, is then stored in the CCDC 106 and in the RF controller 114. When the reformatted hyperlink message is identified by the response from the alphanumeric messaging device, the RF controller sends the message code and the hyperlink identifier back to the messaging terminal 112 which sends them to the CCDC 106, which uses the message code and the hyperlink identifier to determine the resource location of the hyperlink.

It will be appreciated that by using this unique technique, hyperlinks are displayed without a presence of the hyperlink tags and resource locators (which would be confusing to a user). Furthermore, the hyperlinks are uniquely identifiable by a user. This is true when a reformatted hyperlink message is received and displayed by a alphanumeric messaging device that does not have the ability to decode hyperlinks, including those that also lack an ability to present underlined characters or to otherwise change displayable character attributes. This is also true when a reformatted hyperlink message is received by an alphanumeric messaging device that can decode hyperlink messages. Thus, the reformatted hyperlink message is compatible with such alphanumeric messaging devices.

This technique is useful when, for instance, a group call message is broadcast to a plurality of messaging devices that includes those that can and cannot decode hyperlink messages, or those that can and cannot use underlining of characters. This technique is also useful when a system is being first converted to be compatible with hyperlink formatted messages and when the system services mostly conventional alphanumeric messaging devices that do not decode hyperlink characters including those that also do not display underlined characters. The technique is unique in that it a) decodes the hyperlink message in a controller of a messaging system that is separated from the messaging device displaying the hyperlink message by another communication link (in this case, an RF link), b) provides storage of the resource locator in the controller the messaging system, and c) uses a unique character before and after (in the preferred embodiment of the present invention) the identifier of the hyperlink (instead of changing a character attribute of the identifier of the hyperlink).

We claim:

1. A method for processing a hyperlink formatted message to make it compatible with an alphanumeric messaging device that lacks hyperlink decoding ability, wherein the hyperlink formatted message includes at least one hyperlink having tags, a hyperlink identifier, and a resource locator, and wherein the method is used in a messaging controller of a messaging system that communicates with a plurality of alphanumeric messaging devices, the method comprising the steps of:

generating a reformatted hyperlink message, comprising the steps of
replacing all occurrences of a first displayable character within the hyperlink formatted message with a second displayable character,
marking the hyperlink identifier of each of the at least one hyperlink within the hyperlink formatted message using the first displayable character, and
removing the tags and the resource locator of each of the at least one hyperlink; and storing the resource locator of each of the at least one hyperlink in association with the hyperlink identifier.

2. The method according to claim 1, wherein the first displayable character is a back tic and the second displayable character is a single quotation mark.

3. The method according to claim 1, wherein in said step of marking, the hyperlink identifier of each of the at least one hyperlink is marked by prefixing and suffixing the hyperlink identifier with the first displayable character.

4. The method according to claim 1, wherein the hyperlink formatted message is a hypertext markup language (HTML) message, the resource locator is a uniform resource locator, and the tags are HTML anchor tags.

5. The method according to claim 1, wherein in said step of storing, the reformatted hyperlink message is stored in association with each resource locator and hyperlink identifier of the at least one hyperlink.

6. The method according to claim 1, wherein the reformatted hyperlink message is transmitted by an RF transmitter.

7. A method for processing a hyperlink formatted message that is received and displayed by an alphanumeric messaging device that lacks ability to display underlined characters, wherein the hyperlink formatted message includes at least one hyperlink having tags, a hyperlink identifier, and a resource locator, and wherein the method is used in a messaging controller of a messaging system that communicates with a plurality of alphanumeric messaging devices, the method comprising the steps of:

generating a reformatted hyperlink message, comprising the steps of
replacing all occurrences of a first displayable character within the hyperlink formatted message with a second displayable character, marking the hyperlink identifier of each of the at least one hyperlink within the hyperlink formatted message using the first displayable character, and removing the tags and the resource locator of each of the at least one hyperlink; and storing the resource locator of each of the at least one hyperlink in association with the hyperlink identifier.

8. The method according to claim 7, wherein the first displayable character is a back tic and the second displayable character is a single quotation mark.

9. The method according to claim 7, wherein in said step of marking, the hyperlink identifier of each of the at least one hyperlink is marked by prefixing and suffixing the hyperlink identifier with the first displayable character.

10. The method according to claim 7, wherein the hyperlink formatted message is a hypertext markup language (HTML) message, the resource locator is a uniform resource locator, and the tags are HTML anchor tags.

11. The method according to claim 7, wherein in said step of storing, the reformatted hyperlink message is stored in association with each resource locator and hyperlink identifier of the at least one hyperlink.

12. The method according to claim 7, wherein the reformatted hyperlink message is transmitted by an RF transmitter.

* * * * *